United States Patent
Jain et al.

(10) Patent No.: US 12,113,633 B2
(45) Date of Patent: Oct. 8, 2024

(54) INTEGRATION OF OEM ENDPOINT MANAGEMENT AND UNIFIED ENDPOINT MANAGEMENT

(71) Applicant: VMware LLC, Palo Alto, CA (US)

(72) Inventors: Rupesh Jain, Atlanta, GA (US); Gaurav Johari, Austin, TX (US); Xiaorui Wu, Atlanta, GA (US)

(73) Assignee: Omnissa, LLC, Palo Alto, CA (US)

( * ) Notice: Subject to any disclaimer, the term of this patent is extended or adjusted under 35 U.S.C. 154(b) by 0 days.

(21) Appl. No.: 17/653,967

(22) Filed: Mar. 8, 2022

(65) Prior Publication Data
US 2023/0291589 A1    Sep. 14, 2023

(51) Int. Cl.
*H04L 12/12* (2006.01)
*H04L 41/046* (2022.01)

(52) U.S. Cl.
CPC ............ *H04L 12/12* (2013.01); *H04L 41/046* (2013.01)

(58) Field of Classification Search
None
See application file for complete search history.

(56) References Cited

U.S. PATENT DOCUMENTS

| | | | | |
|---|---|---|---|---|
| 8,353,044 B1 * | 1/2013 | Jones | ................... | H04L 63/102 |
| | | | | 718/1 |
| 2015/0295800 A1 * | 10/2015 | Bala | ........................ | H04L 63/20 |
| | | | | 709/224 |
| 2016/0182186 A1 * | 6/2016 | Adler | ................ | H04L 12/40045 |
| | | | | 714/776 |
| 2020/0100269 A1 * | 3/2020 | Gulbay | ................ | H04W 72/048 |
| 2020/0106755 A1 * | 4/2020 | Gulbay | ................ | H04L 63/107 |
| 2020/0137688 A1 * | 4/2020 | Gulbay | ............. | H04W 52/0235 |
| 2022/0239550 A1 * | 7/2022 | Parwani | .............. | H04L 41/0654 |
| 2022/0286370 A1 * | 9/2022 | Iyer | ........................ | G06F 9/4806 |

OTHER PUBLICATIONS

"Testing Intel vPRO Platform-Enabled Client Management from the Cloud," published 2019 (Year: 2019).*
"Dell Command | Intel vPro Out of Band," published Oct. 2021 (Year: 2021).*

* cited by examiner

*Primary Examiner* — Scott B Christensen
(74) *Attorney, Agent, or Firm* — Kim & Stewart LLP

(57) ABSTRACT

Disclosed are various examples for managing endpoints or client devices. A client device can be managed using unified endpoint management (UEM) protocols or using an endpoint management framework. A management console can allow an administrator to perform UEM management actions as well as out-of-band management actions on managed endpoints.

20 Claims, 4 Drawing Sheets

INTEGRATION OF OEM ENDPOINT MANAGEMENT AND UNIFIED ENDPOINT MANAGEMENT

BACKGROUND

Customers, such as enterprises or similar large organizations, often have standardized configurations for computing devices that they procure. Hardware platforms, such as the Intel vPro platform, can provide hardware-based endpoint management features that an information technology administrator (IT admin) can utilize. For example, these hardware-based endpoint management features can provide for out-of-band management of a device so that an IT admin can monitor, maintain, update, upgrade, and repair. Out-of-band management of a device can provide differing or additional management capabilities than in-band management. In-band management of a device typically requires a software agent to be installed and running on an operating system to manage a device. Out-of-band management can provide management capabilities of a device without requiring a software agent to be installed on the device. Some out-of-band management frameworks utilize a separate processor on a device, such as a laptop computer, that can be in communication with an endpoint management server provided by the hardware manufacturer or an integrator.

However, an out-of-band management framework is often separate from an enterprise management system that can be utilized by enterprises to manage users, devices, and other assets of an enterprise. Accordingly, having disparate management systems for in-band and out-of-band management tasks can be cumbersome for an IT admin of an enterprise.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Disclosed are various approaches for combining a unified endpoint management (UEM) system with a services and tools provided by a hardware-based endpoint management agent (EMA) framework. A UEM service can provide endpoint and end-user management capabilities to an IT admin on behalf of an enterprise. In a bring-your-own-device (BYOD) environment, or an environment that involves a mix of BYOD devices and enterprise-issued devices, an IT admin can utilize a management service to oversee the operation of devices, which can also be referred to as endpoints.

The hardware-based EMA framework can include an out-of-band connection as well as an in-band connection to provide certain management features that are provided by a hardware platform vendor or manufacturer. These in-band management features can be separate from the management features that can be provided by the UEM service. In some cases, these management features might be duplicative of the features provided by the UEM service, but the in-band features provided by the EMA framework can be facilitated by a separate EMA agent that can be installed on an endpoint.

Given the increasing complexity that accompanies device and user management in enterprises, examples of this disclosure can integrate a hardware-based EMA framework into existing UEM systems that are utilized by IT admins. Accordingly, an IT admin can manage endpoints that are enrolled with a UEM or management service using UEM tools and commands as well as commands facilitated by the EMA framework through a single management console.

In the following discussion, a general description of the system and its components is provided, followed by a discussion of the operation of the same. Although the following discussion provides illustrative examples of the operation of various components of the present disclosure, the use of the following illustrative examples does not exclude other implementations that are consistent with the principals disclosed by the following illustrative examples.

Figure 1:
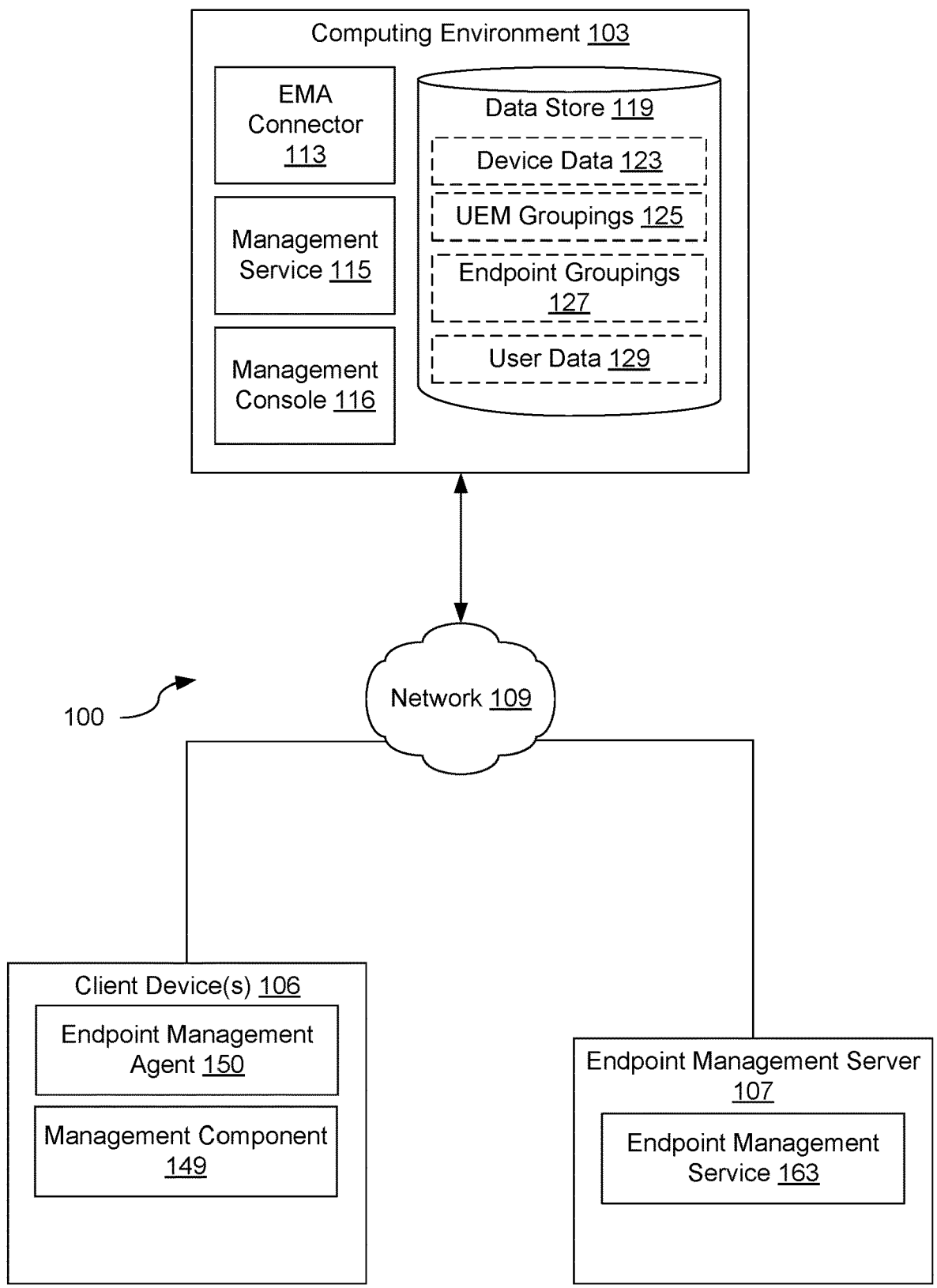
FIG. 1 is a drawing of a network environment according to various embodiments of the present disclosure.

With reference to FIG. 1, shown is a network environment 100 according to various embodiments. The network environment 100 can include a computing environment 103, a client device 106, and an endpoint management server 107, which can be in data communication with each other via a network 109.

The network 109 can include wide area networks (WANs), local area networks (LANs), personal area networks (PANs), or a combination thereof. These networks can include wired or wireless components or a combination thereof. Wired networks can include Ethernet networks, cable networks, fiber optic networks, and telephone networks such as dial-up, digital subscriber line (DSL), and integrated services digital network (ISDN) networks. Wireless networks can include cellular networks, satellite networks, Institute of Electrical and Electronic Engineers (IEEE) 802.11 wireless networks (i.e., WI-FI®), BLUETOOTH® networks, microwave transmission networks, as well as other networks relying on radio broadcasts. The network 109 can also include a combination of two or more networks 109. Examples of networks 109 can include the Internet, intranets, extranets, virtual private networks (VPNs), and similar networks.

The computing environment 103 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 103 can employ a plurality of computing devices that can be arranged in one or more server banks or computer banks or other arrangements. Such computing devices can be located in a single installation or can be distributed among many different geographical locations. For example, the computing environment 103 can include a plurality of computing devices that together can include a hosted computing resource, a grid computing resource or any other distributed computing arrangement. In some cases, the computing environment 103 can correspond to an elastic computing resource where the allotted capacity of processing, network, storage, or other computing-related resources can vary over time.

Various applications or other functionality can be executed in the computing environment 103. The components executed on the computing environment 103 include an EMA connector 113, a management service 115, a management console 116, and other applications, services, processes, systems, engines, or functionality not discussed in detail herein.

The EMA connector 113 can provide connectivity between a management service 115 and an endpoint management server 107 that is potentially managed by a third party or that requires installation as a separate server application that is hosted by the enterprise or by a third party hosting environment. The EMA connector 113 can implement an application programming interface (API) that is provided by the endpoint management server 107 to make certain programmatic calls to obtain data and cause the endpoint management server 107 to take certain actions with respect to devices that are equipped with out-of-band or in-band management features associated with the platform.

For example, the EMA connector 113 can obtain a request from the management service 115 to take a certain out-of-band or in-band management action on a device that is enrolled as a managed device with a UEM system implemented by the management service 115 but that is also a member of an endpoint group in the endpoint management server 107. Accordingly, the EMA connector 113 can translate the request from the management service 115 into an API command that is submitted to an API service provided by the endpoint management server 107 which can cause the action to be performed on the endpoint device.

The management service 115 can oversee the operation of client devices 106 enrolled as managed devices with the management service 115. In some embodiments, an entity, such as one or more enterprises, companies, or other organizations, can operate the management service 115 to oversee or manage the operation of the client devices 106 of its employees, contractors, customers, or other users having an account with the management service 115.

The management service 115 can install various software components on a client device 106. For example, the management service 115 can install client applications, resources, libraries, drivers, configuration profiles, or other components on the client device 106 as specified by an administrator of the management service 115. The management service 115 can also cause policies to be implemented on a client device 106. Policies can include restrictions or permissions pertaining to capabilities of a client device 106 that can pertain to accessing enterprise data on the client device 106.

The management service 115 can interact with one or more client applications executed on the client device 106 to perform management functions. In one example, the management service 115 can interact with a management component 149 on the client device 106, which can carry out various management functions on behalf of the management service 115 on the client device. The management component 149 can be installed when the client device 106 is enrolled as a managed device with the management service 115. When enrolled, the management component 149 can be registered as a device administrator of the client device 106, which can provide the management component 149 with sufficient privileges to control the operation of the client device 106. In one example, the management component 149 can be registered as the device administrator through the installation of a management profile that causes the operating system to designate the management component 149 as the device administrator.

The management service 115 can direct the management component 149 to perform various device management functions on the client device 106. For example, the management service 115 can direct the management component 149 to control access to certain software or hardware functions available on the client device 106. As a result, the management service 115 can verify that the configuration and operation of the client device 106 conforms with predefined criteria that ensures that data on the client device 106 is protected from data loss, unauthorized access, or other harmful events.

The management service 115 can also instruct the management component 149 to install other applications that can provide other capabilities for the user. For example, an application installed on a can include a productivity application, a communication application, a security application, an SSO application, or any other application designated by a user or an administrator as necessary or useful on the device. In one scenario, the management component 149 can install applications on the device on behalf of the user. In other scenarios, a user can download and install an application on the client device 106 without intervention from the management component 149. It should be noted that it is not necessary for a client device 106 to be managed by a management service 115 according to all examples of the disclosure.

The management service 115 can communicate with applications installed on client devices 106 to validate whether an application should be granted access to requested resources. For example, an application can receive a request from another application on the client device. The receiving application can communicate with the management service 115 to validate whether the request is legitimate and/or whether the application from which the request originated is legitimate or potentially malicious.

The management console 116 can be executed to provide an administrative interface to management service 115. In some instances, the management console 116 can be implemented as a standalone or independent application. In other instances, the management console 116 can implemented as a web- or network-based application or service (e.g., a website, web portal, or web service). Accordingly, the management console 116 could be used to upload data stored in the data store 119 or configure data or setting stored in the data store 119.

An IT admin can use the management console 116 to take action one or more endpoints that are managed by the management service 115 and/or the endpoint management server 107. For example, the IT admin can select a grouping of endpoints and push a configuration profile or a policy to the grouping of endpoints. The IT admin can select an endpoint and initiate a keyboard-video-mouse (KVM) session with the endpoint. Certain actions can be facilitated by the EMA connector 113 requesting one or more actions to be taken via the endpoint management server 107, which can in turn communicate with a software agent running on the client device 106 or a hardware-based agent running on the client device 106 in the case of an out-of-band action requested by the IT admin. Other actions can be facilitated by the management service 115 communicating directly with a management component 149 or another software agent running on a client device 106.

Also, various data is stored in a data store 119 that is accessible to the computing environment 103. The data store 119 can be representative of a plurality of data stores 119, which can include relational databases or non-relational databases such as object-oriented databases, hierarchical databases, hash tables or similar key-value data stores, as well as other data storage applications or data structures. The data stored in the data store 119 is associated with the operation of the various applications or functional entities described below. This data can include device data 123, UEM groupings 125, endpoint groupings 127, user data 129 and other data that can be utilized to facilitate endpoint management of a client device 106 that is enrolled with the management service 115.

Device data 123 can include information about user devices that are being used by the users within the enterprise. Device data 123 can include device identifiers, security certificates, configuration profiles, and other information about devices. Device records in the device data 123 can correspond to client devices 106 that are enrolled as managed devices with the management service 115. The client devices 106 can also be enrolled as devices that can be managed via out-of-band or in-band management commands that are implemented by the endpoint management server 107. Accordingly, a device record can also include identifying information with which a client device 106 is identified within the endpoint management server 107.

A device record can include various security settings selected for enforcement on a client device 106 that is enrolled with the management service 115. Accordingly, a device record can include a device identifier associated with a device, such as the client device 106, one or more device certificates, a compliance status, and other data. In some examples, a device record can also identify a user associated with a particular client device 106. The compliance status can indicate whether a particular client device 106 is in compliance with one or more compliance rules.

More specifically, the device record can include one or more of: data describing the identity, type and components of the client device 106; data describing the state of the client device 106; data describing organizational groups to which the client device 106 belongs; data describing compliance rules with which the client device 106 must comply; data describing management policies that specify if, when, and how the client device 106 is permitted to function; and data describing a command queue associated with the client device 106.

For example, data describing the identity, type and components of the client device 106 can specify at least one of more of: a unique identifier associated with the client device 106 (e.g., identifier issued by a manufacturer of the client device or the management service 115), a device type of the client device (e.g., a smartphone, a tablet computing, a laptop computer, a desktop computer, a server computer, or a virtualized instance of any of such computer types), and various software and hardware components of the client device 106 (e.g., operating system [or kernel or bios] type and version, processor type and speed, memory type and size, network interface types, various 110 component types such as camera, touchscreen, keyboard, mouse, printer). More particularly, a device record associated with a client device 106 comprising a network connection television can specify that the client device 106 is a device type of phone, that the client device 106 has an active connection to the Internet, and that the client device 106 has a camera enabled.

Next, data describing the state of the client device 106 can specify, for instance, various settings that are applied to the client device 106, various applications that are installed on or being executed by the client device 106, and various files that are installed on or are accessible to the client device 106. Additionally, the data describing the state of the client device 106 can specify information related to the management of the client device 106, such as the last time the client device 106 provided its state information to the management service 115, whether the client device 106 is in a state of compliance with any applicable compliance rules, and whether any remedial actions have been (or are to be) taken as a result of a noncompliance with any applicable compliance rules. Also being related to the management of the client device 106, the data describing organizational groups to which the client device 106 belongs can, for example, include any organizational groups of which the client device 106 is a member (by virtue of a static hard coded relationship between the client device 106 and an organizational group, or by virtue of a dynamic evaluation of a membership condition associated with an organizational group, as described later herein).

Further, the device record can include data describing a command queue associated with the client device 106. For example, the management service 115 can maintain a command queue of commands that are designated for execution against the client device 106. As described herein, a client device 106 can be provisioned by the management service 115 by causing resources to be installed or stored on the client device 106. To implement such process, the management service 115 can store a command related to provisioning in the command queue. Additionally, the management service 115 can store a command related to a remedial action associated with a compliance rule in the command queue, in the event that it is determined that a rule condition associated with the compliance rule has occurred. Whether a provisioning command or a command related to a remedial action is stored in the command queue, the client device 106 can retrieve commands stored in its command queue through various ways that are described later herein (e.g., through a client-server "pull system" or through a client-server "push system").

Finally, data describing compliance rules with which the client device 106 must comply can, for instance, specify one or more security policies to which the client device 106 must adhere, a compliance status of the client device 106, and one or more remedial actions that should be performed in the event that an associated rule condition occurs, as described later herein. In some embodiments, the data describing compliance rules and the data describing management policies are obtained from an organizational record associated with an organizational group to which the client device 106 is a member (i.e., the compliance rules associated with the organizational group are reflected in the device record of the member client device 106).

A compliance status of a client device 106 represents whether the device is in compliance with one or more compliance rules. Various compliance rules can be enforced on the client device 106 by the management service 115. Compliance rules can be based on time, geographical location, or device and network properties. For instance, the client device 106 can satisfy a compliance rule when the client device 106 is located within a particular geographic location. The client device 106 can satisfy a compliance rule in other examples when the client device 106 is in communication with a particular local area network, such as a particular local area network that is managed by the computing environment 103. Furthermore, a compliance rule in another example can be based upon the time and date matching specified values.

A compliance rule can specify that a client device 106 is required to be powered off or be in a low power "sleep" state during a specified time period. Another compliance rule can specify that a client device 106 is required to be powered on or be in a normal operation "awake" state during a specified time period. As another example, a compliance rule can specify that a client device 106 is prohibited from rendering content that has been designated as confidential. A compliance rule can also specify whether a camera associated with the client device 106 must be enabled or disabled. The compliance rule can also specify certain times of the day, week, or year in which certain hardware or software features are permitted to be enabled or disabled.

Another example of a compliance rule involves whether a user belongs to a particular user group. For instance, a compliance rule can include a whitelist or a blacklist that specifies whether particular users or groups of users are authorized to perform various functionalities, such as installing or executing a particular application.

Other examples of compliance rules include a rule that specifies whether a client device 106 is compromised or "jailbroken." For example, a client device 106 can have hardware or software protections in place that prevent unauthorized modifications of the client device 106. If these protections are overridden or bypassed, the client device 106 can be considered out of compliance. As another example, a compliance rule can specify that the client device 106 is required to authenticate a user using a password or personal identification number (PIN) in order to unlock the client device 106.

A compliance rule can also require that the client device 106 has device encryption enabled, where data stored on the device is stored in an encrypted form. The data can be encrypted by a device certificate. A compliance rule can also require that the client device 106 be enrolled with the management service 115 as a managed device. Another compliance rule can specify that the user is required to accept the terms of service that are presented by the management component 149 on the client device 106. As another example, a compliance rule can specify that the management component 149 is required to periodically communicate or "check-in" with the management service 115 to report on its status. If a threshold amount of time has elapsed since the previous check-in of the client device 106, the client device 106 can be considered to have violated this compliance rule.

Another compliance rule can specify that a client device 106 run one of a specified variant or version of a particular operating system. A compliance rule can also specify that an enrolled device be manufactured by a particular manufacturer or have a particular manufacturer identifier. Another compliance rule can specify that an enrolled device be a particular model name or model number. A client device 106 can also be considered out of compliance if the device is in a data roaming mode or has used a threshold amount of a periodic network data usage allowance.

A compliance rule can also identify a list of required applications that must be installed on the client device 106 or a list of forbidden applications that cannot be installed on the client device 106. The management component 145 can remove a forbidden application or install a missing required application on the client device 106 in response to detecting a violation of such a compliance rule. A compliance rule can also require the presence of a mobile device management (MDM) profile, an MDM storage area, an application profile, and/or a configuration profile. The management component 145 can obtain and store missing required data or containers on the client device 106 in response to detecting a violation of such a compliance rule.

Therefore, the compliance status indicates whether and to what extent a particular client device 106 is compliant with compliance rules assigned to the client device 106 by the management service 115. The compliance status can be determined by a management component 145 on the client device 106 that analyzes the status of the client device 106 and reports compliance to the management service 115. In other examples, the compliance status can be determined by the management service 115 based upon state information describing the client device 106, which can be reported by the management component 145. The compliance status can also include the state of various hardware or software features of the client device 106 without respect to whether the status of the features are determined by a compliance rule.

UEM groupings 125 can specify groupings of client devices 106 or endpoints that are enrolled as managed devices with the management service 115. Devices can be organized into groupings according to user groups, organizational groups within a directory service, such as Microsoft Active Directory®, geographic location, office location, operating system type or version, device manufacturer, user role, employment status, or other identifying information by which users or devices can be grouped. UEM groupings 125 can be created by an IT admin so that certain applications, policies, profile, and other user data can be easily deployed to an entire grouping of devices.

Endpoint groupings 127 can specify groupings of client devices 106 or endpoints that are managed by the endpoint management server 107. Data identifying endpoint groupings 127 can be imported from the endpoint management server 107. Endpoint groupings 127 can identify endpoints, or client devices 106, by a device identifier that might be different from a device identifier used by the management service 115 to identify managed devices.

User data 129 can include user identifiers, authentication credentials, other identifying information about users, and information about devices to which users are assigned, such as identifying information about a user's smartphone, wearable devices, or other computing devices that are assigned to or used by the user.

The client device 106 is representative of a plurality of client devices that can be coupled to the network 109. A client device 106 is interchangeably referred to herein as an endpoint. The client device 106 can include a processor-based system such as a computer system. Such a computer system can be embodied in the form of a personal computer (e.g., a desktop computer, a laptop computer, or similar device), a mobile computing device (e.g., personal digital assistants, cellular telephones, smartphones, web pads, tablet computer systems, music players, portable game consoles, electronic book readers, and similar devices), or other devices with like capability. The client device 106 can include one or more displays, such as liquid crystal displays (LCDs), gas plasma-based flat panel displays, organic light emitting diode (OLED) displays, electrophoretic ink ("E-ink") displays, projectors, or other types of display devices. In some instances, the display can be a component of the client device 106 or can be connected to the client device 106 through a wired or wireless connection.

The client device 106 can be configured to execute various applications such as a management component 149. The client device 106 can be configured to execute applications beyond the management component 149, such as email applications, social networking applications, word processors, spreadsheets, or other applications.

The management component 149 can connect to the management service 115 in order to configure a client device 106 in compliance with a configuration profile. The management component 149 could be installed, for example, at the factory that manufactured the client device 106 (e.g., as part of a machine image used to configure the client device 106). In other examples, the management component 149 can be installed when a user or IT admin enrolls the device to be a managed device with the management service 115.

The management component 149 can be downloaded from an application repository in response to a command from the management service 115 that is issued to a management API provided by an operating system of the client device 106. The management component 149 can manage the client device 106 on behalf of the management service 115 by installing profiles, applications, policies, and enforcing compliance rules.

The endpoint management agent 150 is an application separate from the management component 149 that can be installed on the client device 106. The endpoint management agent 150 can be a software agent that facilitates in-band management commands that can be received from the endpoint management server 107. The endpoint management agent 150 can be created by a hardware manufacturer that creates and/or maintains the hardware-based out-of-band and in-band management tools that are separate from the UEM management provided by the management service 115 that utilizes operating system management capabilities.

Accordingly, the endpoint management agent 150 can communicate with the endpoint management server 107 to receive management commands that are provided by the hardware-based endpoint management system on the client device 106. The In some cases, the endpoint management agent 150 can facilitate in-band management of a client device 106 utilizing the hardware-based endpoint management system via the endpoint management agent 150 on the client device 106, while a hardware-based subsystem or processor can provide out-of-band management features that do not rely upon the endpoint management agent 150.

The computing environment 107 can include one or more computing devices that include a processor, a memory, and/or a network interface. For example, the computing devices can be configured to perform computations on behalf of other computing devices or applications. As another example, such computing devices can host and/or provide content to other computing devices in response to requests for content.

Moreover, the computing environment 107 can employ a plurality of computing devices that can be arranged in one or more server banks or computer banks or other arrangements. Such computing devices can be located in a single installation or can be distributed among many different geographical locations. For example, the computing environment 107 can include a plurality of computing devices that together can include a hosted computing resource, a grid computing resource or any other distributed computing arrangement. In some cases, the computing environment 107 can correspond to an elastic computing resource where the allotted capacity of processing, network, storage, or other computing-related resources can vary over time.

Various applications or other functionality can be executed in the computing environment 107. The components executed on the computing environment 107 include an endpoint management service 163, and other applications, services, processes, systems, engines, or functionality not discussed in detail herein.

The endpoint management service 163 can represent a server process that can perform out-of-band or in-band management of an endpoint. The endpoint management service 163 can hosted within a computing environment 103 of the enterprise or in a separate environment such as the endpoint management server 107. The endpoint management service 163 can be hosted on-premises or in the cloud in certain installations.

The endpoint management service 163 can provide various management features provided by the hardware platform associated with a client device 106. For example, the endpoint management service 163 can transmit a wake command or a wake-on-LAN command to a client device 106, a sleep command, a hibernate command, a restart command, or a power-off command to the client device 106. These commands can be sent in response to a request from the EMA connector 113, which can request the command to the sent by the management service 115 acting on behalf of an IT admin. These management commands can be sent as an out-of-band management command to the client device 106. As another example, the endpoint management service 163 can further send an alert message to an endpoint in the form of a pop-up window displayed by the endpoint management agent 150 as an in-band management command.

As another example, the endpoint management service 163 can initiate a KVM session with an endpoint via the endpoint management agent 150, which can allow an IT admin to remotely view video from the endpoint desktop and send inputs, such as keyboard and mouse inputs, to the endpoint. A KVM session can be initiated by an IT admin using the management console 116, which can cause the EMA connector 113 to request the endpoint management service 163 to initiate a KVM session with the endpoint and stream video to the EMA connector 113, which can in turn provide the video from the desktop of the endpoint to the management console 116. Inputs from a keyboard and/or mouse of the IT admin can be tunneled through the endpoint management service 163 to the endpoint management agent 150, which can cause the inputs to be effectuated on the endpoint.

In some examples, a client device 106 may not have the endpoint management agent 150 installed. Accordingly, to allow the endpoint management service 163 to manage the device with in-band management tools, the management service 115 can cause the endpoint management agent 150 to be installed on the client device 106. Accordingly, the client device 106 can be enrolled as a managed device with the management service 115, which can issue a command to install the endpoint management agent 150 on the client device 106. In response to receiving the command, the management component 149 can install the endpoint management agent 150 on the client device 106.

Figure 2:
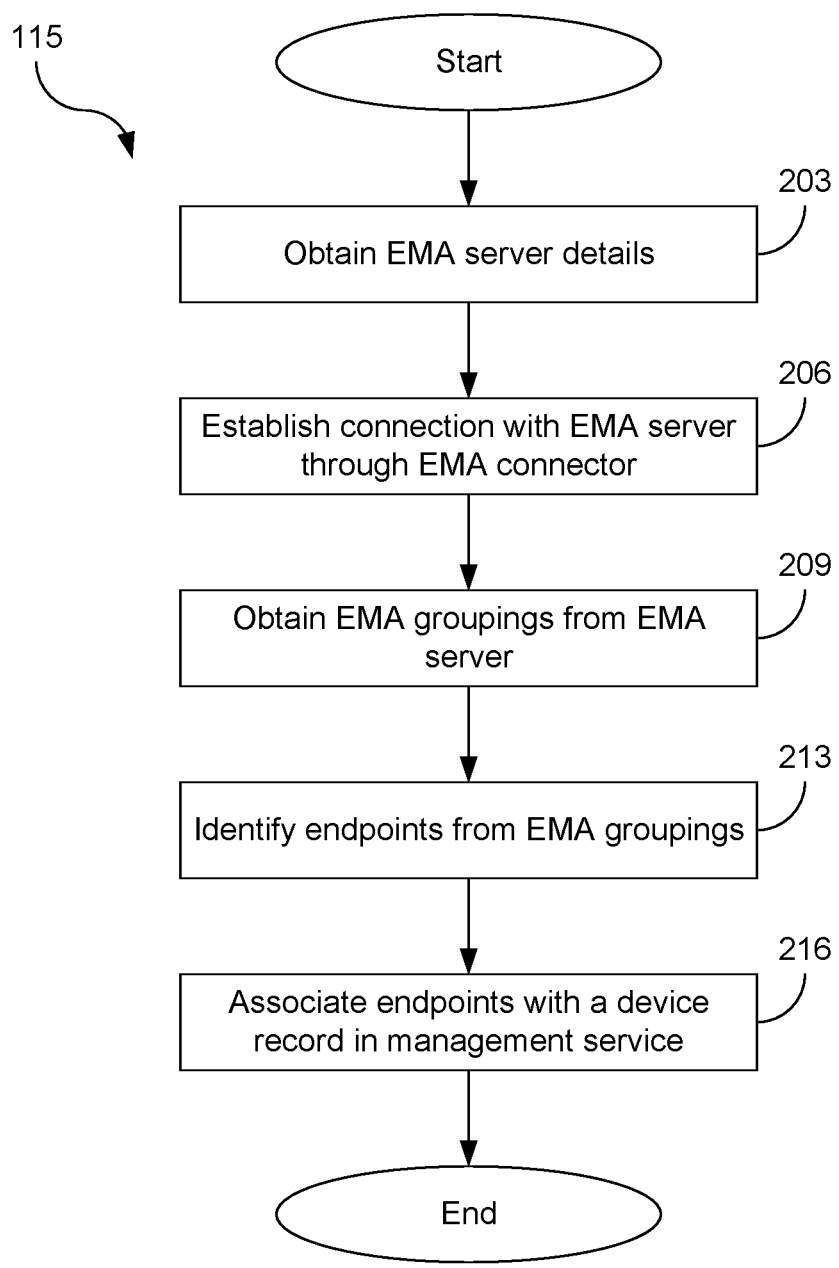
FIG. 2 is a flowchart illustrating one example of functionality implemented as portions of an application executed in a computing environment in the network environment of FIG. 1 according to various embodiments of the present disclosure.

Referring next to FIG. 2, shown is a flowchart that provides one example of the operation of a portion of the management service 115. The flowchart of FIG. 2 provides merely an example of the many different types of functional arrangements that can be employed to implement the operation of the depicted portion of the management service 115. As an alternative, the flowchart of FIG. 2 can be viewed as depicting an example of elements of a method implemented within the network environment 100. FIG. 2 illustrates how the management service 115 can perform a device discovery procedure or process to obtain information about the endpoints that can be managed by the endpoint management server 107. The device discovery process can utilize the EMA connector 113 to obtain identifying information about devices for which in-band and out-of-band management commands can be executed via the endpoint management agent 150 and for devices that can be managed by the management service 115 via UEM management techniques.

Beginning with step 203, the management service 115 can obtain the server details for the endpoint management server 107 and/or the endpoint management service 163. The server details can include a server network address, login details, security protocols or certificates, or other identifying information. The server details can be provided via the management console 116 by an IT admin who is provisioning the management service 115 to communicate with the endpoint management server 107.

At step 206, the management service 115 can establish a connection with the endpoint management server 107 through the EMA connector 113. The EMA connector 113 can save the server details so that the EMA connector 113 can communicate with the endpoint management service 163 on behalf of the management service 115 to cause the endpoint management service 163 to carry out management commands using the hardware-based endpoint management infrastructure. The management service 115 can establish the connection by requesting that the EMA connector 113 test the server details provided at step 203 to determine whether the EMA connector 113 can connect to the endpoint management service 163.

At step 209, the management service 115 can obtain data regarding endpoint groupings from the endpoint management server 107. The endpoint groupings can identify one or more endpoints that are managed by the endpoint management server 107. The endpoint groupings can identify devices by a endpoint identifier, network address, hardware address, MAC address, or any other device identifier that can uniquely identify the endpoint within the endpoint management server 107.

At step 213, the management service 115 can associate endpoints in the endpoint groupings obtained from the endpoint management server 107 with respective managed devices that are enrolled as managed devices with the management service 115. The device data 123 utilized by the management service 115 to perform UEM management of endpoints can identify devices differently from the endpoint management server 107. Accordingly, a device identifier utilized by the endpoint management server 107 or endpoint management service 163 can be correlated to a device identifier utilized by the management service 115 to identify endpoints.

At step 216, the management service 115 can associate the endpoints from the endpoint groupings obtained from the endpoint management server 107 with a device record within the device data 123 utilized by the management service 115 for UEM management of client devices 106. The identifying information about devices that can be managed using the endpoint management service 163 can be saved in the device data 123 available to the management service 115. Accordingly, the endpoints can be managed through the management console 116 by an IT admin using UEM commands or EMA commands that are sent via the endpoint management service 163. Thereafter, the process can proceed to completion.

Figure 3:
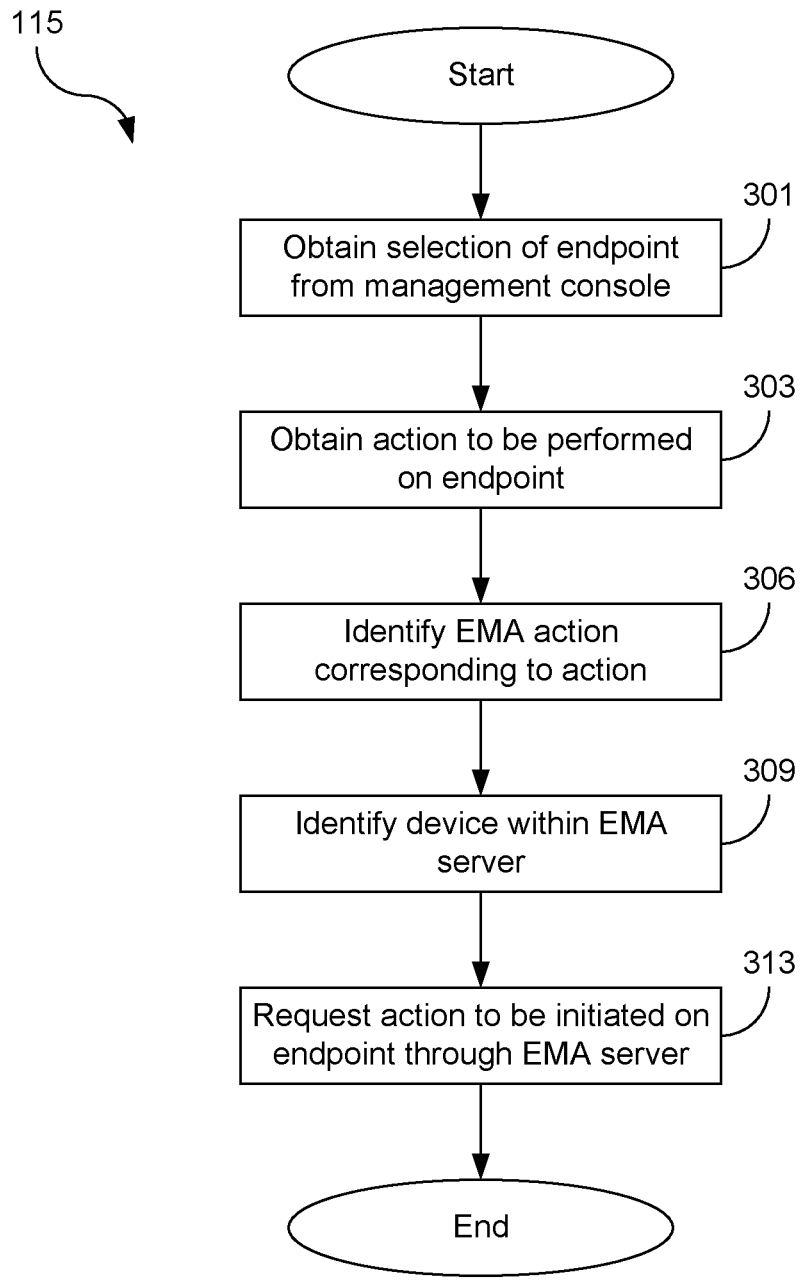
FIG. 3 is a flowchart illustrating one example of functionality implemented as portions of an application executed in a computing environment in the network environment of FIG. 1 according to various embodiments of the present disclosure.

Referring next to FIG. 3, shown is a flowchart that provides one example of the operation of a portion of the management service 115. The flowchart of FIG. 3 provides merely an example of the many different types of functional arrangements that can be employed to implement the operation of the depicted portion of the management service 115. As an alternative, the flowchart of FIG. 3 can be viewed as depicting an example of elements of a method implemented within the network environment 100. FIG. 3 illustrates how the management service 115 can issue a command via the endpoint management service 163 to run an EMA management command on an endpoint. The process can utilize the EMA connector 113 to communicate with the endpoint via the endpoint management service 163. The command can be executed on the endpoint via the endpoint management agent 150 or a hardware-based system in the case of an out-of-band management command.

Beginning with step 301, the management service 115 can obtain a selection of an endpoint from the management console 116. An IT admin can select a particular managed device on which the IT admin wishes to perform a management action. The device can be represented in a user interface within the management console 116.

At step 303, the management service 115 can obtain a selection of an action to be performed on the selected endpoint. The action can be an action that can be taken on an endpoint via the management component 149, in which case the management service 115 can issue the management command directly to the client device 106 using a UEM API provided by the operating system of the client device 106 or through another direct mechanism with which the client device 106 can be contacted. If the action is an EMA command that is issued via the endpoint management service 163, the command can be issued via the EMA connector 113 and the endpoint management service 163 through an in-band or an out-of-band management command provided by a hardware-based endpoint management system such as Intel vPro.

At step 306, the management service 115 can identify an EMA action corresponding to the selected action obtained from the management console 116. For example, the endpoint management service 163 can transmit a wake command or a wake-on-LAN command to a client device 106, a sleep command, a hibernate command, a restart command, or a power-off command to the client device 106. These commands can be sent in response to a request from the EMA connector 113, which can request the command to the sent by the management service 115 acting on behalf of an IT admin. These management commands can be sent as an out-of-band management command to the client device 106. As another example, the endpoint management service 163 can further send an alert message to an endpoint in the form of a pop-up window displayed by the endpoint management agent 150 as an in-band management command.

At step 309, the management service 115 can identify the endpoint as it is identified within the endpoint management server 107. For example, the endpoint may be identified using an identifier within the endpoint management server 107 that is different from an identifier within the management service 115. Accordingly, the identifying information for the device can be discovered or ingested during the device discovery process of FIG. 2 and stored or persisted in the data store 119.

At step 313, the management service 115 can request the action to be initiated on the selected endpoint using the endpoint management service 163 running on the endpoint management server 107. The management service 115 can request the action to be performed via the EMA connector 113. The EMA connector 113 can request the action on the endpoint by sending a request for the action along with identifying information for the endpoint to the endpoint management server 107. Thereafter, the process can proceed to completion.

Figure 4:
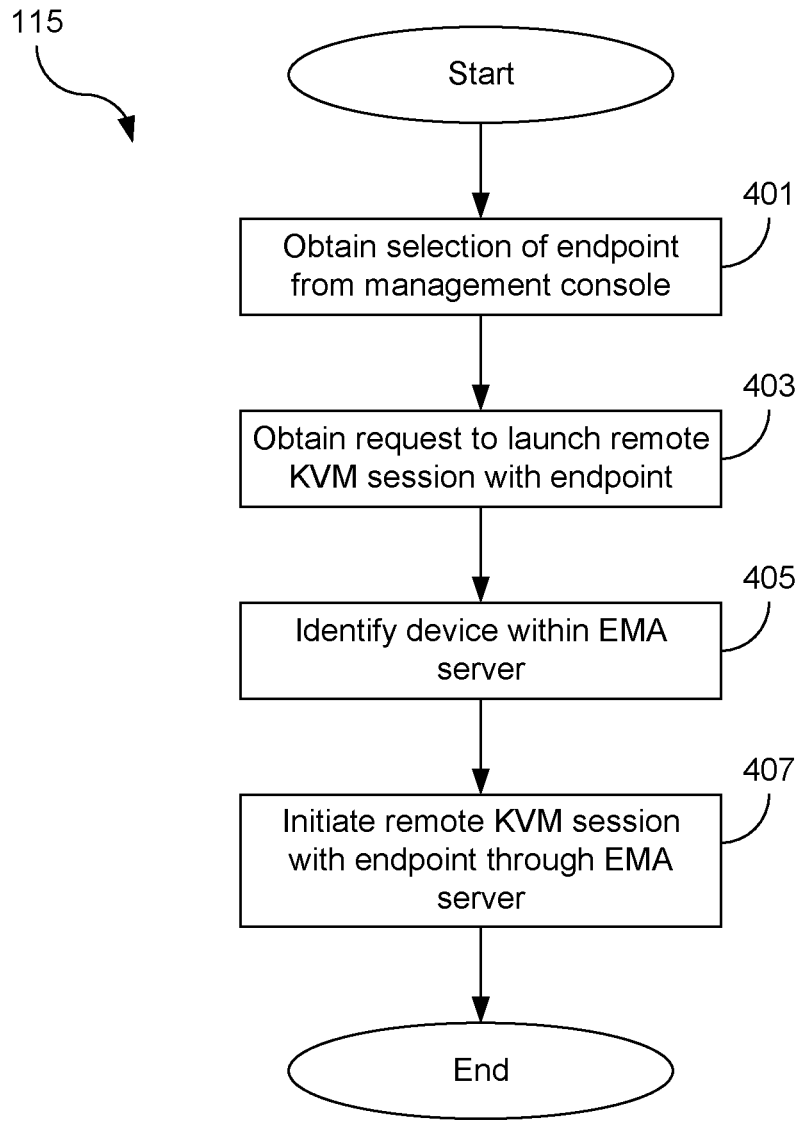
FIG. 4 is a flowchart illustrating one example of functionality implemented as portions of an application executed in a computing environment in the network environment of FIG. 1 according to various embodiments of the present disclosure.

Referring next to FIG. 4, shown is a flowchart that provides one example of the operation of a portion of the management service 115. The flowchart of FIG. 4 provides merely an example of the many different types of functional arrangements that can be employed to implement the operation of the depicted portion of the management service 115. As an alternative, the flowchart of FIG. 4 can be viewed as depicting an example of elements of a method implemented within the network environment 100. FIG. 4 illustrates how the management service 115 can initiate a KVM session with a selected endpoint. The process can utilize the EMA connector 113 to communicate with the endpoint via the endpoint management service 163. A command can be executed on the endpoint via the endpoint management agent 150 to facilitate the KVM session.

Beginning with step 401, the management service 115 can obtain a selection of an endpoint from the management console 116. An IT admin can select a particular managed device on which the IT admin wishes to perform a management action. The device can be represented in a user interface within the management console 116.

At step 403, the management service 115 can obtain a request to launch a remote KVM session with the selected endpoint. The endpoint management service 163 can initiate a KVM session with an endpoint via the endpoint management agent 150, which can allow an IT admin to remotely view video from the endpoint desktop and send inputs, such as keyboard and mouse inputs, to the endpoint. A KVM session can be initiated by an IT admin using the management console 116, which can cause the EMA connector 113 to request the endpoint management service 163 to initiate a KVM session with the endpoint and stream video to the EMA connector 113, which can in turn provide the video from the desktop of the endpoint to the management console 116. Inputs from a keyboard and/or mouse of the IT admin can be tunneled through the endpoint management service 163 to the endpoint management agent 150, which can cause the inputs to be effectuated on the endpoint.

At step 405, the management service 115 can identify the endpoint as it is identified within the endpoint management server 107. For example, the endpoint may be identified using an identifier within the endpoint management server 107 that is different from an identifier within the management service 115. Accordingly, the identifying information for the device can be discovered or ingested during the device discovery process of FIG. 2 and stored in the data store 119.

At step 407, the management service 115 can request the remote KVM session to be initiated on the selected endpoint using the endpoint management service 163 running on the endpoint management server 107. The management service 115 can request the session to be initiated via the EMA connector 113. The EMA connector 113 can request the session to be initiated on the endpoint by sending a request for the action along with identifying information for the endpoint to the endpoint management server 107. Thereafter, the process can proceed to completion.

A number of software components previously discussed are stored in the memory of the respective computing devices and are executable by the processor of the respective computing devices. In this respect, the term "executable" means a program file that is in a form that can ultimately be run by the processor. Examples of executable programs can be a compiled program that can be translated into machine code in a format that can be loaded into a random access portion of the memory and run by the processor, source code that can be expressed in proper format such as object code that is capable of being loaded into a random access portion of the memory and executed by the processor, or source code that can be interpreted by another executable program to generate instructions in a random access portion of the memory to be executed by the processor. An executable program can be stored in any portion or component of the memory, including random access memory (RAM), read-only memory (ROM), hard drive, solid-state drive, Universal Serial Bus (USB) flash drive, memory card, optical disc such as compact disc (CD) or digital versatile disc (DVD), floppy disk, magnetic tape, or other memory components.

The memory includes both volatile and nonvolatile memory and data storage components. Volatile components are those that do not retain data values upon loss of power. Nonvolatile components are those that retain data upon a loss of power. Thus, the memory can include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, or other memory components, or a combination of any two or more of these memory components. In addition, the RAM can include static random access memory (SRAM), dynamic random access memory (DRAM), or magnetic random access memory (MRAM) and other such devices. The ROM can include a programmable read-only memory (PROM), an erasable programmable read-only memory (EPROM), an electrically erasable programmable read-only memory (EEPROM), or other like memory device.

Although the applications and systems described herein can be embodied in software or code executed by general purpose hardware as discussed above, as an alternative the same can also be embodied in dedicated hardware or a combination of software/general purpose hardware and dedicated hardware. If embodied in dedicated hardware, each can be implemented as a circuit or state machine that employs any one of or a combination of a number of technologies. These technologies can include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts and sequence diagrams show the functionality and operation of an implementation of portions of the various embodiments of the present disclosure. If embodied in software, each block can represent a module, segment, or portion of code that includes program instructions to implement the specified logical function(s). The program instructions can be embodied in the form of source code that includes human-readable statements written in a programming language or machine code that includes numerical instructions recognizable by a suitable execution system such as a processor in a computer system. The machine code can be converted from the source code through various processes. For example, the machine code can be generated from the source code with a compiler prior to execution of the corresponding application. As another example, the machine code can be generated from the source code concurrently with execution with an interpreter. Other approaches can also be used. If embodied in hardware, each block can represent a circuit or a number of interconnected circuits to implement the specified logical function or functions.

Although the flowcharts and sequence diagrams show a specific order of execution, it is understood that the order of execution can differ from that which is depicted. For example, the order of execution of two or more blocks can be scrambled relative to the order shown. Also, two or more blocks shown in succession can be executed concurrently or with partial concurrence. Further, in some embodiments, one or more of the blocks shown in the flowcharts and sequence diagrams can be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that includes software or code can be embodied in any non-transitory computer-readable medium for use by or in connection with an instruction execution system such as a processor in a computer system or other system. In this sense, the logic can include statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. Moreover, a collection of distributed computer-readable media located across a plurality of computing devices (e.g, storage area networks or distributed or clustered filesystems or databases) can also be collectively considered as a single non-transitory computer-readable medium.

The computer-readable medium can include any one of many physical media such as magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium can be a random access memory (RAM) including static random access memory (SRAM) and dynamic random access memory (DRAM), or magnetic random access memory (MRAM). In addition, the computer-readable medium can be a read-only memory (ROM), a programmable read-only memory (PROM), an erasable programmable read-only memory (EPROM), an electrically erasable programmable read-only memory (EEPROM), or other type of memory device.

Further, any logic or application described herein can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices in the same computing environment 103.

Disjunctive language such as the phrase "at least one of X, Y, or Z," unless specifically stated otherwise, is otherwise understood with the context as used in general to present that an item, term, etc., can be either X, Y, or Z, or any combination thereof (e.g., X, Y, or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications can be made to the above-described embodiments without departing substantially from the spirit and principles of the disclosure. All such modifications and variations are intended to be included herein within the scope of this disclosure and protected by the following claims.

Therefore, the following is claimed:

1. A system, comprising:
  a computing device comprising a processor and a memory; and
  machine-readable instructions stored in the memory that, when executed by the processor, cause the computing device to at least:
    obtain server details including authentication details for a hardware-based out-of-band endpoint management server;
    initiate a device discovery procedure with the hardware-based out-of-band endpoint management server using the server details, the device discovery procedure obtaining identifying data about a plurality of endpoints enrolled with the hardware-based out-of-band endpoint management server;
    persist the identifying data about the plurality of endpoints in a data store accessible to a management service running on the computing device;
    obtain a first request to perform an action on an endpoint of the plurality of endpoints;
    determine that the first request can be carried out using the hardware-based out-of-band endpoint management server without using an endpoint management agent installed on the endpoint;
    obtain a second request to perform another action on the endpoint;
    determine that the second request cannot be carried out without using the endpoint management agent installed on the endpoint;
    identify, by the management service, an endpoint identifier within the hardware-based out-of-band endpoint management server corresponding to the endpoint based upon the stored identifying data; and
    based on the identified endpoint identifier:
      transmit, by the management service, a command corresponding to the first request to the hardware-based out-of-band endpoint management server to cause the hardware-based out-of-band endpoint management server to perform the action on the endpoint; and
      transmit, by the management service, a management command corresponding to the second request to the endpoint management agent installed on the endpoint.

2. The system of claim 1, wherein the action comprises an out-of-band power operation, the out-of-band power operation comprising one of a wake-on-LAN command, a sleep command, a hibernate command, or a power-off command.

3. The system of claim 1, wherein the action comprises a keyboard-video-mouse (KVM) command through which the management service can remotely interact with endpoint to provide at least one of keyboard inputs or video inputs to the endpoint.

4. The system of claim 1, wherein the management service causes the endpoint management agent to be installed on the plurality of endpoints.

5. The system of claim 4, wherein said another action is performed by the endpoint management agent on the endpoint.

6. The system of claim 1, wherein the device discovery procedure associates the endpoint identifier within the hardware-based out-of-band endpoint management server with a respective device identifier within the management service.

7. The system of claim 1, wherein the action is performed by transmitting a command to an application programming interface (API) provided by the hardware-based out-of-band endpoint management server, the command comprising identifying information associated with the endpoint.

8. A method, comprising:
obtaining, with a computing device, server details including authentication details for a hardware-based out-of-band endpoint management server;
initiating a device discovery procedure with the hardware-based out-of-band endpoint management server using the server details, the device discovery procedure obtaining identifying data about a plurality of endpoints enrolled with the hardware-based out-of-band endpoint management server;
persisting the identifying data about the plurality of endpoints in a data store accessible to a management service running on the computing device;
obtaining a first request to perform an action on an endpoint of the plurality of endpoints;
determining that the first request can be carried out using the hardware-based out-of-band endpoint management server without using an endpoint management agent installed on the endpoint;
obtaining a second request to perform another action on the endpoint;
determining that the second request cannot be carried out without using the endpoint management agent installed on the endpoint;
identifying, by the management service, an endpoint identifier within the hardware-based out-of-band endpoint management server corresponding to the endpoint based upon the stored identifying data; and
based on the identified endpoint identifier:
transmitting, by the management service, a command corresponding to the first request to the hardware-based out-of-band endpoint management server to cause the hardware-based out-of-band endpoint management server to perform the action on the endpoint; and
transmitting, by the management service, a management command corresponding to the second request to the endpoint management agent installed on the endpoint.

9. The method of claim 8, wherein the action comprises an out-of-band power operation, the out-of-band power operation comprising one of a wake-on-LAN command, a sleep command, a hibernate command, or a power-off command.

10. The method of claim 8, wherein the action comprises a keyboard-video-mouse (KVM) command through which the management service can remotely interact with endpoint to provide at least one of keyboard inputs or video inputs to the endpoint.

11. The method of claim 8, wherein the management service causes the endpoint management agent to be installed on the plurality of endpoints.

12. The method of claim 11, wherein said another action is performed by the endpoint management agent on the endpoint.

13. The method of claim 8, wherein the device discovery procedure associates the device identifier within the hardware-based out-of-band endpoint management server with a respective device identifier within the management service.

14. The method of claim 8, wherein the action is performed by transmitting a command to an application programming interface (API) provided by the hardware-based out-of-band endpoint management server, the command comprising identifying information associated with the endpoint.

15. A non-transitory, computer-readable medium, comprising machine-readable instructions that, when executed by a processor of a computing device, cause the computing device to at least:
obtain server details including authentication details for a hardware-based out-of-band endpoint management server;
initiate a device discovery procedure with the hardware-based out-of-band endpoint management server using the server details, the device discovery procedure obtaining identifying data about a plurality of endpoints enrolled with the hardware-based out-of-band endpoint management server;
persist the identifying data about the plurality of endpoints in a data store accessible to a management service running on the computing device;
obtain a first request to perform an action on an endpoint of the plurality of endpoints;
determine that the first request can be carried out using the hardware-based out-of-band endpoint management server without using an endpoint management agent installed on the endpoint;
obtain a second request to perform another action on the endpoint;
determine that the second request cannot be carried out without using the endpoint management agent installed on the endpoint;
identify, by the management service, an endpoint identifier within the hardware-based out-of-band endpoint management server corresponding to the endpoint based upon the stored identifying data; and
based on the identified endpoint identifier:
transmit, by the management service, a command corresponding to the first request to the hardware-based out-of-band endpoint management server to cause the hardware-based out-of-band endpoint management server to perform the action on the endpoint; and
transmit, by the management service, a management command corresponding to the second request to the endpoint management agent installed on the endpoint.

16. The non-transitory, computer-readable medium of claim 15, wherein the action comprises an out-of-band power operation, the out-of-band power operation comprising one of a wake-on-LAN command, a sleep command, a hibernate command, or a power-off command.

17. The non-transitory, computer-readable medium of claim 15, wherein the action comprises a keyboard-video-mouse (KVM) command through which the management service can remotely interact with endpoint to provide at least one of keyboard inputs or video inputs to the endpoint.

18. The non-transitory, computer-readable medium of claim 15, wherein the management service causes the endpoint management agent to be installed on the plurality of endpoints.

19. The non-transitory, computer-readable medium of claim 18, wherein said another action is performed by the endpoint management agent on the endpoint.

20. The non-transitory, computer-readable medium of claim 15, wherein the device discovery procedure associates the endpoint identifier within the hardware-based out-of-band endpoint management server with a respective device identifier within the management service.

* * * * *